(12) United States Patent
Lin et al.

(10) Patent No.: US 9,405,883 B2
(45) Date of Patent: Aug. 2, 2016

(54) POWER RAIL FOR PREVENTING DC ELECTROMIGRATION

(71) Applicant: TAIWAN SEMICONDUCTOR MANUFACTURING CO., LTD., Hsinchu (TW)

(72) Inventors: Chin-Shen Lin, Taipei (TW); Jerry Chang-Jui Kao, Taipei (TW); Nitesh Katta, Hsinchu (TW); Chou-Kun Lin, Hsin-Chu (TW); Yi-Chuin Tsai, Pingtung County (TW); Chi-Yeh Yu, Hsinchu (TW); Kuo-Nan Yang, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 14/857,212

(22) Filed: Sep. 17, 2015

(65) Prior Publication Data
US 2016/0004809 A1   Jan. 7, 2016

Related U.S. Application Data

(62) Division of application No. 14/098,435, filed on Dec. 5, 2013, now Pat. No. 9,165,882.

(60) Provisional application No. 61/883,747, filed on Sep. 27, 2013.

(51) Int. Cl.
*G06F 17/50* (2006.01)
*H01L 23/522* (2006.01)
*H01L 23/528* (2006.01)

(52) U.S. Cl.
CPC ........ *G06F 17/5081* (2013.01); *G06F 17/5077* (2013.01); *H01L 23/5226* (2013.01); *H01L 23/5286* (2013.01); *G06F 2217/76* (2013.01); *G06F 2217/78* (2013.01); *G06F 2217/82* (2013.01); *H01L 2924/0002* (2013.01)

(58) Field of Classification Search
USPC .......................... 716/111, 115, 127, 133, 136
See application file for complete search history.

(56) References Cited

U.S. PATENT DOCUMENTS 6,794,674 B2    9/2004  Kusumoto
6,822,473 B1 *  11/2004 Hau-Riege ............. G01R 27/26
                                                324/762.01

(Continued)

OTHER PUBLICATIONS

Non-Final Office Action U.S. Appl. No. 14/098,435 dated Jun. 25, 2014.

(Continued)

*Primary Examiner* — Brian Ngo
(74) *Attorney, Agent, or Firm* — McDermott Will & Emery LLP

(57) ABSTRACT

A method is disclosed that includes the operations outlined below. A first criteria is determined to be met when directions of a first current and a second current around a first end and a second end of a metal segment respectively are opposite, in which the metal segment is a part of a power rail in at least one design file of a semiconductor device and is enclosed by only two terminal via arrays. A second criteria is determined to be met when a length of the metal segment is not larger than a electromigration critical length. The metal segment is included in the semiconductor device with a first current density limit depending on the length of the metal segment when the first and the second criteria are met.

20 Claims, 10 Drawing Sheets

(56) References Cited

U.S. PATENT DOCUMENTS

| | | | |
|---|---|---|---|
| 8,510,695 B1 * | 8/2013 | Demircan | G06F 17/5036 716/110 |
| 8,694,945 B2 * | 4/2014 | Wang | H01L 23/5286 257/786 |
| 2002/0149116 A1 * | 10/2002 | Kusumoto | G06F 17/5077 257/777 |
| 2009/0164964 A1 * | 6/2009 | Stamper | H01L 23/528 716/130 |
| 2009/0294901 A1 * | 12/2009 | Bonilla | H01L 23/5256 257/529 |
| 2013/0326448 A1 * | 12/2013 | Demircan | G06F 17/5081 716/112 |
| 2014/0109030 A1 * | 4/2014 | Lee | G06F 17/5036 716/115 |
| 2014/0203435 A1 * | 7/2014 | Angyal | H01L 21/7685 257/751 |
| 2014/0203436 A1 | 7/2014 | Filippi et al. | |

OTHER PUBLICATIONS

Non-Final Office Action U.S. Appl. No. 14/098,435 dated Sep. 12, 2014.

Non-Final Office Action U.S. Appl. No. 14/098,435 dated Feb. 26, 2015.

Notice of Allowance U.S. Appl. No. 14/098,435 dated Jun. 17, 2015.

* cited by examiner

US 9,405,883 B2

POWER RAIL FOR PREVENTING DC ELECTROMIGRATION

RELATED APPLICATIONS

The present application is a division of U.S. application Ser. No. 14/098,435, filed Dec. 5, 2013, which claims priority to U.S. Application Ser. No. 61/883,747, filed Sep. 27, 2013, the disclosure of which is hereby incorporated by reference herein in its entirety.

BACKGROUND

Electromigration is the transport of material caused by the gradual movement of the ions in a conductor due to the momentum transfer between conducting electrons and diffusing metal atoms. The effect appears in applications where high direct current densities are used, such as in microelectronics and related structures. As the structure size in electronics such as integrated circuits (ICs) decreases, the effect becomes more apparent.

BRIEF DESCRIPTION OF THE DRAWINGS

The invention can be more fully understood by reading the following detailed description of the embodiment, with reference made to the accompanying drawings as follows.

DETAILED DESCRIPTION

In the following description, specific details are presented to provide a thorough understanding of the embodiments of the present disclosure. Persons of ordinary skill in the art will recognize, however, that the present disclosure can be practiced without one or more of the specific details, or in combination with other components. Well-known implementations or operations are not shown or described in detail to avoid obscuring aspects of various embodiments of the present disclosure.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

Figure 1:
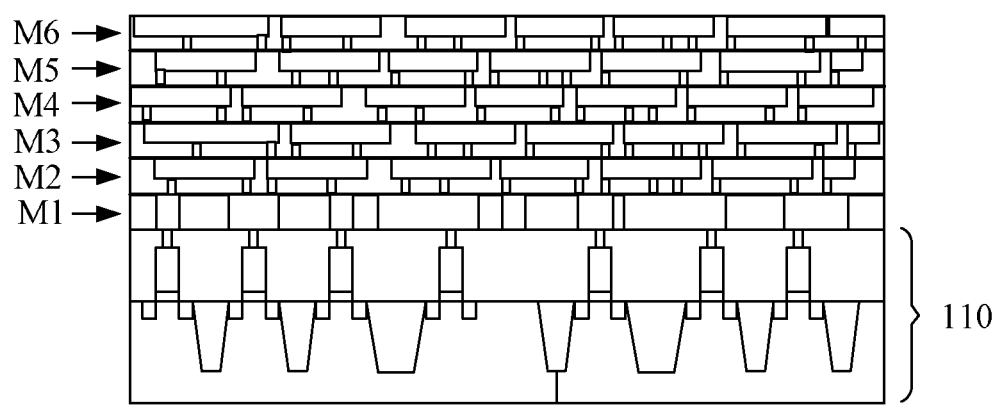
FIG. 1 is a schematic diagram of a semiconductor device in accordance with various embodiments of the present disclosure.

FIG. 1 is a schematic diagram of a semiconductor device 100 in accordance with various embodiments of the present disclosure. The semiconductor device 100 includes a device portion 110 and a plurality of metal layers M1-M6.

In some embodiments, the metal layers M1-M6 are formed on the device portion 110 and are connected to the device portion 110. The metal layers M1-M6 include a plurality of metal lines (not labeled) to connect different integrated circuit (IC) components (not labeled) in the device portion 110 together.

Figure 2:
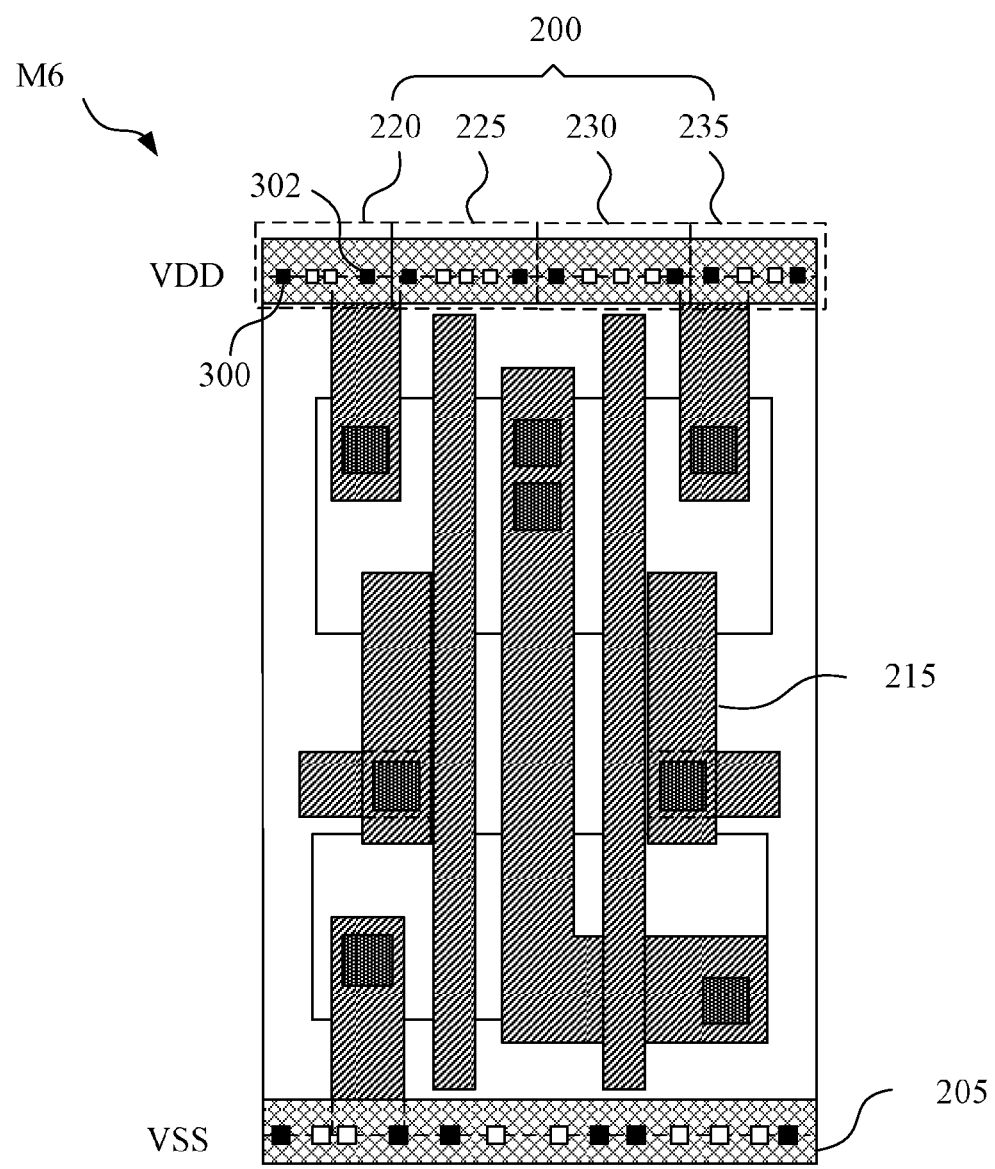
FIG. 2 is an exemplary diagram of a partial top view of the metal layer in accordance with various embodiments of the present disclosure.

FIG. 2 is an exemplary diagram of a partial top view of the metal layer M6 in accordance with various embodiments of the present disclosure.

For illustration in FIG. 2, the metal layer M6 includes power rails 200 and 205 and signal lines 215. The power rails 200 and 205 provide power to the IC components of the device portion 110 in the semiconductor device 100 depicted in FIG. 1. In some embodiments, the power rail 200 is connected to a power supply VDD, and the power rail 205 is connected to a ground terminal VSS. The signal lines 215 transmit signals, e.g., data signals or clock signals, between different IC components of the device portion 110.

The power rail 200 includes a plurality of metal segments 220, 225, 230 and 235. In some embodiments, each of the metal segments 220, 225, 230 and 235 is enclosed by two terminal via arrays. In some embodiments, each of the metal segments 220, 225, 230 and 235 is enclosed by only two terminal via arrays. For illustration, the metal segment 220 is enclosed by via arrays 300 and 302.

A first part of the metal segments 220, 225, 230 and 235 meet a certain criteria. These qualified metal segments are formed with a first current density limit depending on the lengths of their own respectively.

A second part of the metal segments 220, 225, 230 and 235 do not meet the criteria. These metal segments are formed with a second current density limit depending on the total length of the power rail 200.

In some embodiments, the second current density limit is smaller than the first current density limit. Explained in a different way, when the widths of the first part and the second part of the metal segments 220, 225, 230 and 235 are the same, the first part of the metal segments 220, 225, 230 and 235 allow a larger amount of current to flow therethrough, in which the second part of the metal segments 220, 225, 230 and 235 allow a smaller amount of current to flow therethrough.

Effectively, the first part of the metal segments 220, 225, 230 and 235 that meet the criteria suffer less from the effect of direct current electromigration (DC EM). On the other hand, the second part of the metal segments 220, 225 and 230 that do not meet the criteria suffer more from the effect of DC EM.

Therefore, the formation of the power rail 200 allows the first part of the metal segments to be formed with a more relaxed DC EM rules according to their own lengths. On the contrary, the second part of the metal segments 220, 225, 230 and 235 are formed with a stricter DC EM rules according to the total length of the power rail 200. More specifically, it is not necessary to form the whole power rail 200 according to the total length of the power rail 200. Better performance, power and area results for the semiconductor device 100 in FIG. 1 can be achieved while the occurrence of the DC EM is prevented.

In some embodiments, the power rail 205 that is connected to the ground terminal VSS is formed with the same method described above.

Figure 3A:
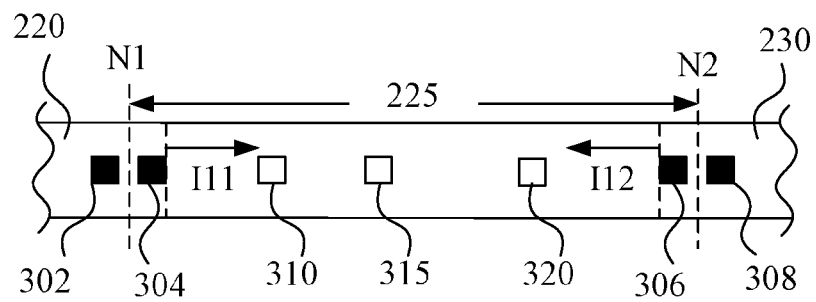
FIGS. 3A-3D are partial top views of the power rail in different current conditions in accordance with various embodiments of the present disclosure.
Figure 3B:
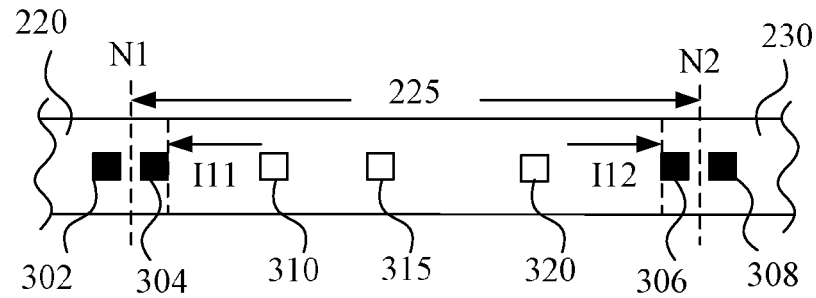
Figure 3C:
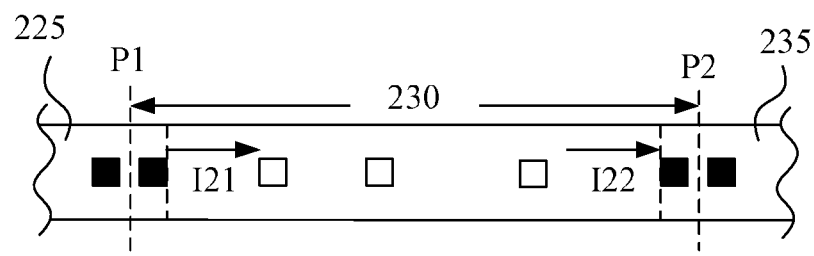
Figure 3D:
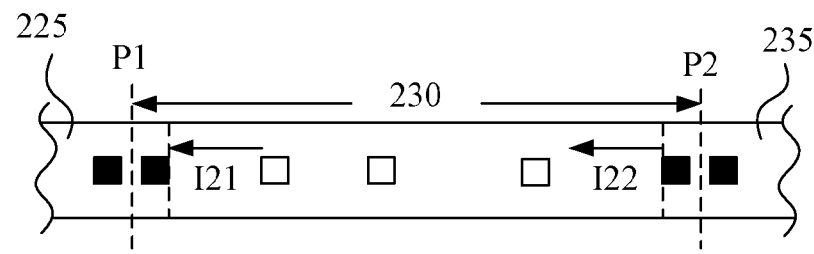

FIGS. 3A-3D are partial top views of the power rail 200 in different current conditions in accordance with various embodiments of the present disclosure. In FIGS. 3A-3B, metal segments 220, 225 and 230 of the power rail 200 are illustrated. In FIGS. 3C-3D, metal segments 225, 230 and 235 of the power rail 200 are illustrated.

Figure 4:
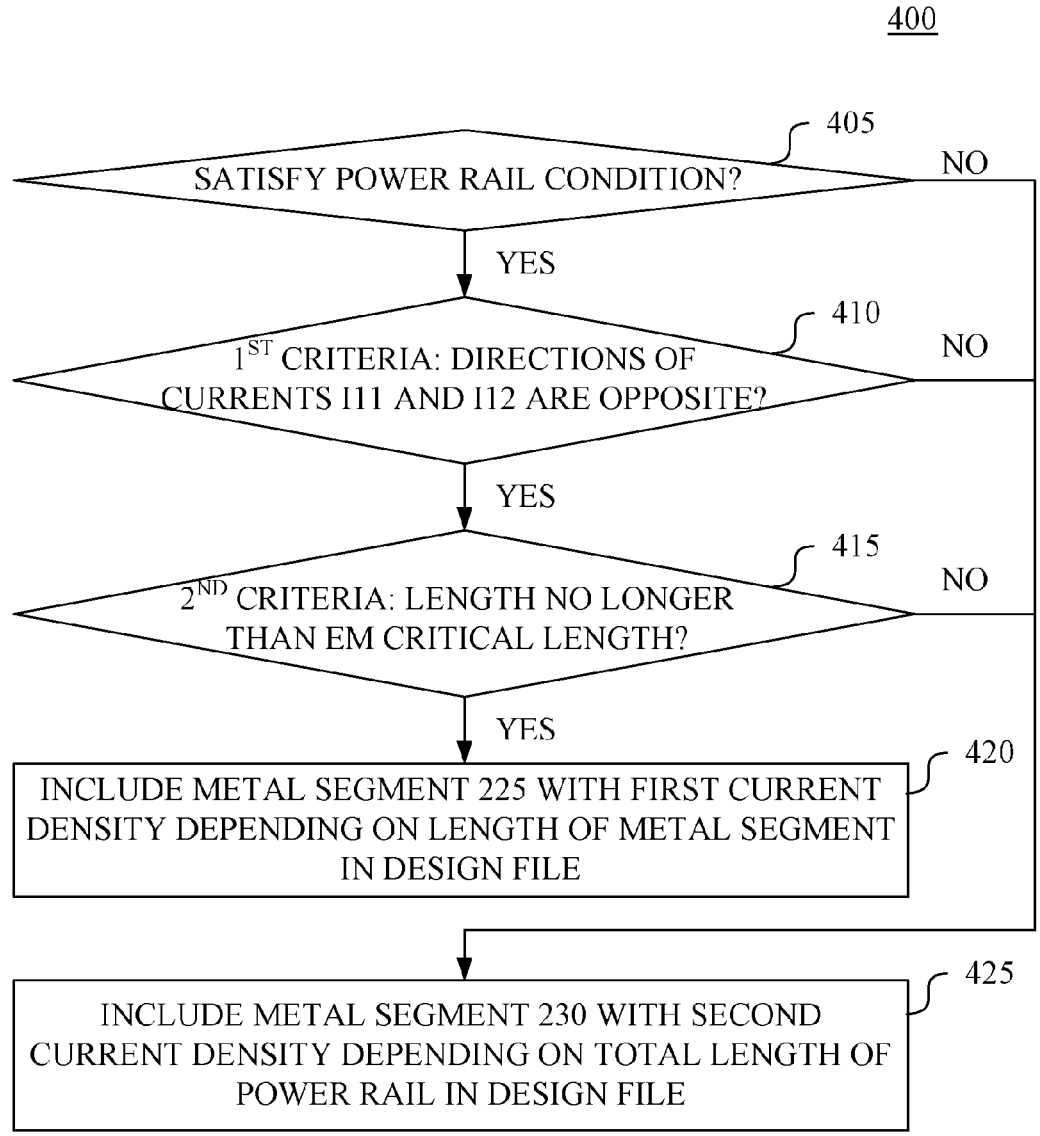
FIG. 4 is a flow chart of a method illustrating the process of forming the power rail in FIG. 2, in accordance with various embodiments of the present disclosure.

FIG. 4 is a flow chart of a method 400 illustrating the process of forming the power rail 200 in FIG. 2, in accordance with various embodiments of the present disclosure.

For illustration, the formation of the power rail 200 in FIG. 2 is described by the method 400 with reference to FIG. 3A-3D.

In operation 405, whether the metal segments 220, 225, 230 and 235 satisfy a power rail condition is determined.

Take the metal segment 225 illustrated in FIG. 3A for example, in some embodiments, the first end N1 of the metal segment 225 is defined to be in the middle of the via array 304 and the via array 302 in the neighboring metal segment 220. The second end N2 of the metal segment 225 are defined to be in the middle of the via array 306 and the via array 308 in the neighboring metal segment 230.

In some embodiments, the power rail condition is satisfied when the metal segment 225 is enclosed by two terminal via arrays 304 and 306. In further embodiments, each of the terminal via arrays 304 and 306 includes different number of vias. In some embodiments, the terminal via arrays 304 and 306 are the vias having the same current polarity. Explained in a different way, the terminal via arrays 304 and 306 either both inject current to the power rail 200 or both sink current from power rail 200. Since the power rail 200 is connected to the power supply VDD as shown in FIG. 2, both of the terminal via arrays 304 and 306 inject current to the power rail 200. In some embodiments, each the terminal via arrays 304 and 306 includes a square via array or a rectangular via.

In some embodiments, the metal segment 225 includes the vias 310, 315 and 320 that have the current polarity different from the current polarity of the terminal via arrays 304 and 306. Explained in a different way, when the terminal via arrays 304 and 306 inject current to the power rail 200, the vias 310, 315 and 320 sink current from power rail 200. When the terminal via arrays 304 and 306 sink current from power rail 200, the vias 310, 315 and 320 inject current to the power rail 200.

In some embodiments, besides the conditions described above, the width of each of the metal segments 220, 225, 230 and 235 needs to be within a range, for example from about 0.09 micro meters to about 0.18 micro meters, and no jog, branch or bend exists on the metal segments 220, 225, 230 and 235 to satisfy the power rail condition.

The amount and the differences of the currents in the metal segments 220, 225, 230 and 235 need not be taken into consideration during the determination of the power rail condition.

In operation 410, whether a first criteria is met is determined for each of the metal segments 220, 225, 230 and 235, in which the metal segment 220, 225, 230 and 235 is a part of the power rail 200 in at least one design file of the semiconductor device 100.

The first criteria is determined to be met when directions of a first current and a second current around the first end and the second end of the under-determined metal segment respectively are opposite.

In operation 415, whether a second criteria is met is determined for each of the metal segments 220, 225, 230 and 235.

The second criteria is determined to be met when a length of the under-determined metal segment is not larger than an electromigration critical length. For a numerical example, the electromigration critical length is substantially 5 micro meters.

In some embodiments, as illustrated in FIG. 3A, the first current 111 and the second current 112 around the first end N1 and the second end N2 of the metal segment 225 both flow toward the center of the metal segment 225. Therefore, the directions of the first current 111 and the second current 112 are opposite. The metal atoms in the metal segment 225 illustrated in FIG. 3A tend to accumulate at the first end N1 and the second ends N2 under the influence of the first current 111 and the second current 112.

In some embodiments, as illustrated in FIG. 3B, the first current 111 and the second current 112 around the first end N1 and the second end N2 of the metal segment 225 flow toward the first end N1 and the second end N2 of the metal segment 225 respectively. Therefore, the directions of the first current 111 and the second current 112 illustrated in FIG. 3B are opposite too. The metal atoms of the metal segment 225 illustrated in FIG. 3B tend to accumulate at the center of the metal segment 225.

The metal segment 225 illustrated in both FIG. 3A and FIG. 3B meets the first criteria.

Further, when the metal segment 225 is short enough and meets the second criteria, the metal atoms are not able to travel too far under the influence of the first current 111 and the second current 112. The accumulation and the short movement of the metal atoms within the metal segment 225 prevent the structure of the metal segment 225 from loosening. As a result, the metal segment 225 is formed to have a larger current density limit.

Afterwards, in operation 420, the metal segment 225 is included in the at least one design file of the semiconductor device 100 in FIG. 1 with a first current density limit depending on the length of the metal segment 225 when the first and the second criteria are met.

In some embodiments, as illustrated in FIG. 3C, the first current 121 flows toward the center of the metal segment 230 and the second current 122 flows toward the second end P2. Therefore, the directions of the first current 121 and the second current 122 are the same. The metal atoms in the metal segment 230 illustrated in FIG. 3C tend to move against the direction of the first current 121 and the second current 122.

In some embodiments, as illustrated in FIG. 3D, the first current 121 flows toward the first end P1 and the second current 122 flows toward the center of the metal segment 230. Therefore, the directions of the first current 121 and the second current 122 are the same. The metal atoms in the metal segment 230 illustrated in FIG. 3D tend to move against the direction of the first current 121 and the second current 122.

The metal atoms in the metal segment 230 illustrated in both FIG. 3C and FIG. 3D do not accumulate. The metal segment 230 illustrated in both FIG. 3C and FIG. 3D does not meet the first criteria.

When the metal segment 230 is not short enough and does not meet the second criteria, the metal atoms moves a long distance under the influence of the first current 121 and the second current 122. The tendency of drifting or the long movement of the metal atoms is easy to loosen the structure of the metal segment 230.

Thereafter, in operation 425, the metal segment 230 that does not meet at least one of the first and the second criteria in operations 410 and 415, or the other metal segments that do not satisfy the power rail condition in operation 405, are included in the at least one design file of with a second current density limit smaller than the first current density limit depending on the total length of the power rail 200.

Further, the semiconductor device 100 is fabricated according to the at least one design file.

Based on the operations 405-425, the metal segments 220, 225, 230 and 235 in the power rail 200 are formed according to different current conditions. The metal segments that are more endurable against the DC EM, such as the metal segment 225 illustrated in FIG. 3A or FIG. 3B, are formed with a higher current density limit. A more relaxed DC EM rule is applied according to the length of each of these metal segments. On the contrary, the metal segments that are not endurable against the DC EM, such as the metal segment 230 illustrated in FIG. 3C or FIG. 3D, are formed with a current density limit lower than that of the endurable metal segments. A stricter DC EM rule is applied according to the length of the whole power rail 200.

Figure 5A:
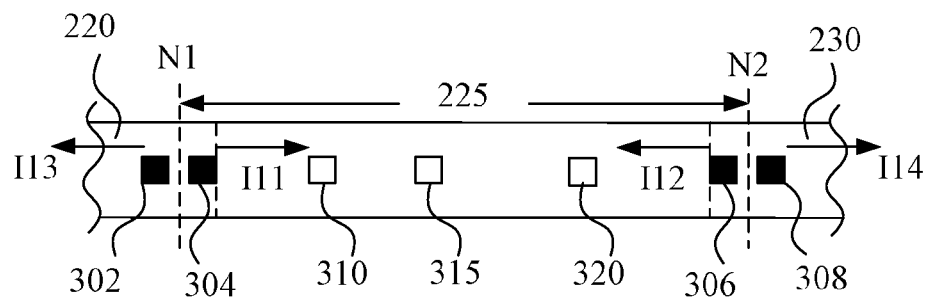
FIGS. 5A-5B are partial top views of the power rail in different current conditions in accordance with various embodiments of the present disclosure.
Figure 5B:
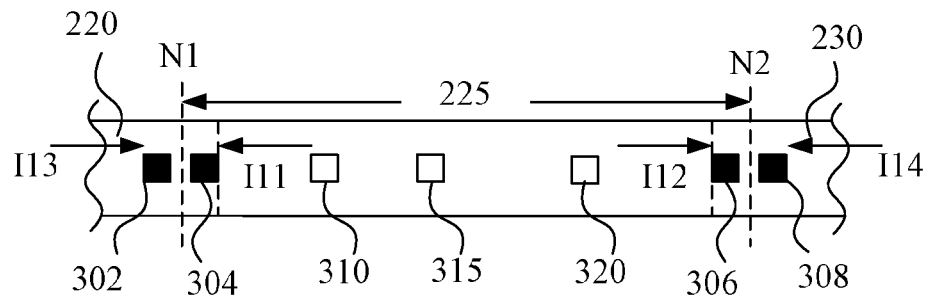

FIGS. 5A-5B are partial top views of the power rail 200 in different current conditions in accordance with various embodiments of the present disclosure. In FIGS. 5A-5B, metal segments 220, 225 and 230 of the power rail 200 are illustrated.

Figure 6:
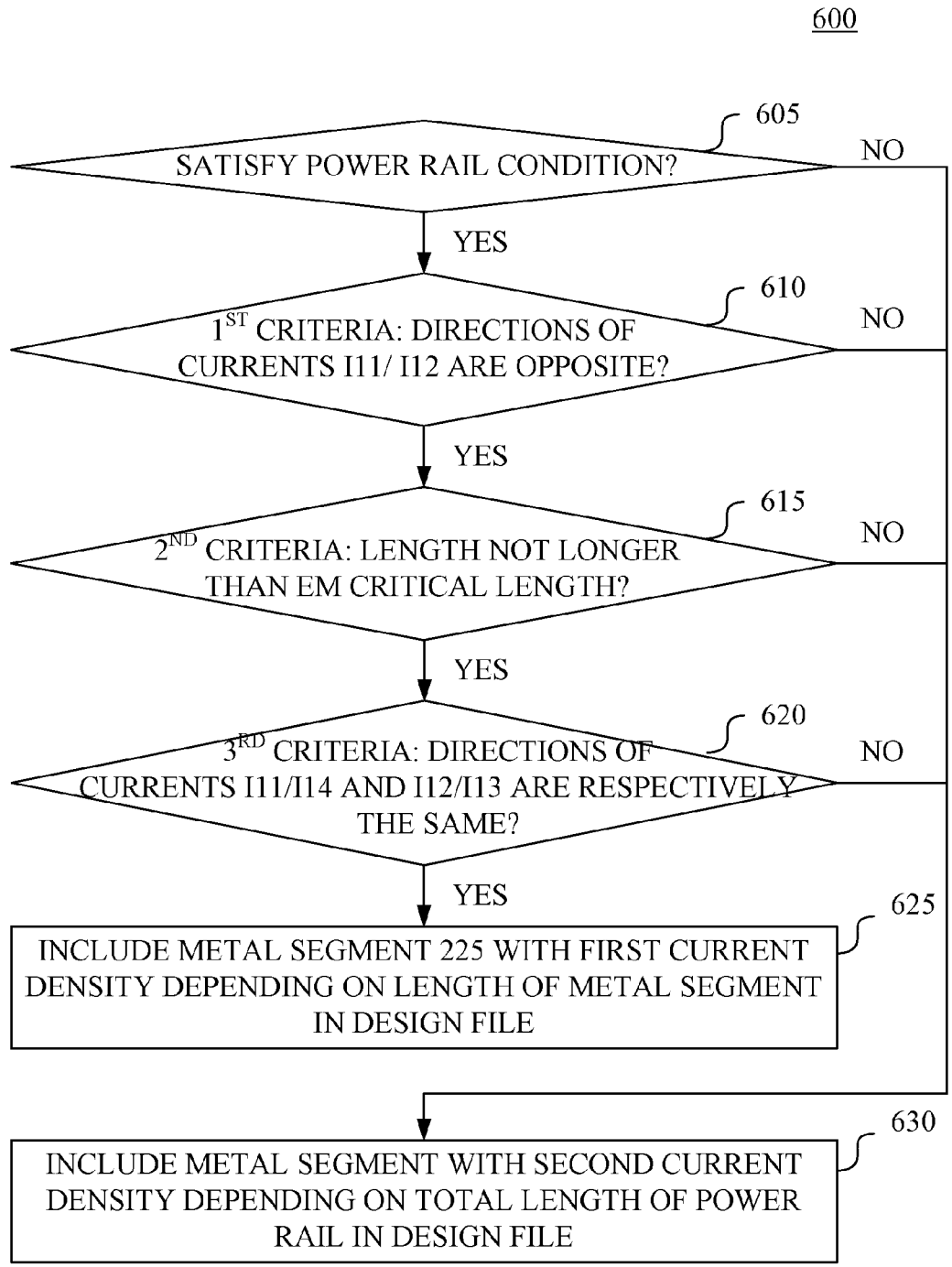
FIG. 6 is a flow chart of a method illustrating the process of forming the power rail in FIG. 2, in accordance with various embodiments of the present disclosure.

FIG. 6 is a flow chart of a method 600 illustrating the process of forming the power rail 200 in FIG. 2, in accordance with various embodiments of the present disclosure.

For illustration, the formation of the power rail 200 in FIG. 2 is described by the method 600 with reference to FIG. 5A-5B.

The operations 605, 610 and 615 are substantially the same as the operations 405, 410 and 415 illustrated in FIG. 4. Therefore, no further detail is discussed herein.

In operation 620, whether a third criteria is met is determined for each of the metal segments 220, 225, 230 and 235.

The third criteria is determined to be met when a third current in a first neighboring metal segment coupled to the first end has the same direction as the second current, and when a fourth current in a second neighboring metal segment coupled to the second end has the same direction as the first current.

In some embodiments, as illustrated in FIG. 5A, the directions of the first current 111 and the second current 112 of the metal segment 225 are opposite. The third current 113 in the neighboring metal segment 220 flows in a direction that is against the metal segment 225, and is the same as the direction of the second current 112. The fourth current 114 in the neighboring metal segment 230 flows in a direction that is against the metal segment 225, and is the same as the direction of the first current 111. The metal atoms in the metal segment 225 illustrated in FIG. 5A tend to accumulate at the first end N1 and the second end N2 of the metal segment 225 under the influence of the first current 111 and the second current 112. Further, the metal atoms in the neighboring metal segments 220 and 230 do not influence the metal segment 225.

In some embodiments, as illustrated in FIG. 5B, the directions of the first current 111 and the second current 112 of the metal segment 225 are opposite. The third current 113 in the neighboring metal segment 220 flows in a direction that is toward the metal segment 225, and is the same as the direction of the second current 112. The fourth current 114 in the neighboring metal segment 230 flows in a direction that is toward the metal segment 225, and is the same as the direction of the first current 111. The metal atoms in the metal segment 225 illustrated in FIG. 5B tend to accumulate at the center of the metal segment 225 under the influence of the first current 111 and the second current 112. Further, the metal atoms in the neighboring metal segments 220 and 230 do not influence the metal segment 225.

Afterwards, in operation 625, the metal segment 225 is included in the at least one design file of the semiconductor device 100 in FIG. 1 with a first current density limit depending on the length of the metal segment 225 when the first, the second and the third criteria are met.

On the contrary, when the third current 113 is not in the same direction as the second current 112 or when the fourth current 114 is not in the same direction as the first current 111, the metal segment 225 is influenced by the atoms in the neighboring metal segment 220 or the neighboring metal segment 230.

Thereafter, in operation 630, the metal segments that do not meet at least one of the first, the second criteria and the third criteria in operations 610, 615 and 620, or the metal segments that do not satisfy the power rail condition in operation 605, are included in the at least one design file of with a second current density limit smaller than the first current density limit depending on the total length of the power rail 200.

Further, the semiconductor device 100 is fabricated according to the at least one design file.

Based on the operations 605-630, the formation of the metal segments 220, 225, 230 and 235 in the power rail 200 further takes the neighboring metal segments into consideration. The metal segments that meet the first, the second and the third criteria, such as the metal segment 225 illustrated in FIG. 5A or FIG. 5B, are even reliable than the metal segments only meet the first and the second criteria. Therefore, the power rail 200 formed based on the operations 605-630 is more robust to the DC EM.

Figure 7A:
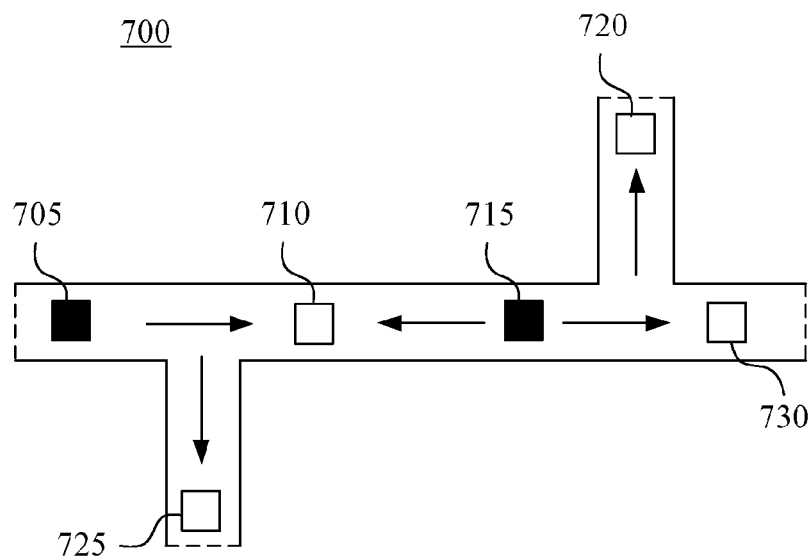
FIG. 7A is a partial top view of a power rail in one of the metal layers M1-M6 in FIG. 1 in accordance with various embodiments of the present disclosure.
Figure 7B:
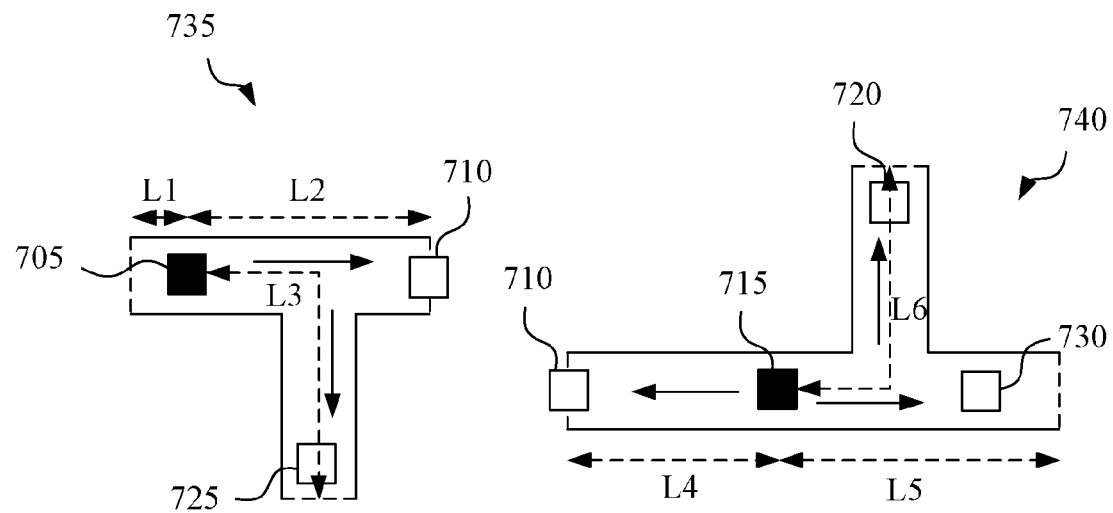
FIG. 7B is an exemplary diagram illustrating metal segments that the power rail includes in accordance with various embodiments of the present disclosure.

FIG. 7A is a partial top view of a power rail 700 in one of the metal layers M1-M6 in FIG. 1 in accordance with various embodiments of the present disclosure. FIG. 7B is an exemplary diagram illustrating metal segments 735 and 740 that the power rail 700 includes.

The power rail 700 includes a plurality of vias 705, 710, 715, 720, 725 and 730. The arrows in FIG. 7A represent the electron flows. According to the electron flows, the vias 705-730 are categorized into sinking vias and injecting vias. The sinking vias are the vias that sink electrons from the power rail 700, such as the vias 710, 720, 725 and 730. The via 710 is further called a cut via since the via 710 receives electrons from both directions.

The injecting vias, such as the vias 705 and 715, are the vias that inject electrons to the power rail 700. The via 705 and 715 are further called a starting via respectively since the via 705 and 715 inject electrons to the power rail 700 without sinking electron.

As illustrated in FIG. 7B, the metal segments 735 and 740 that the power rail 700 includes are separated by the cut via 710. Each of the metal segments 735 and 740 includes a plurality of sub-segments each starts from a starting via to a terminal of the metal segments 735 and 740. The metal segment 735 includes three sub-segments having a length of L1, a length of L2 and a length of L3 respectively. The metal segment 740 includes three sub-segments having a length of L4, a length of L5 and a length of L6 respectively.

The metal segment 735 is formed with a current density limit depending on the maximum length L3 of the sub-segments. The metal segment 740 is formed with a current density limit depending on the maximum length L6 of the sub-segments. Since the maximum length of the sub-segments is the longest possible distance of the migration of the metal atoms in the metal segments 735 and 740, the formation of the metal segments 735 and 740 can use the maximum length as an effective length to apply a more relax DC EM rule.

In some embodiments, the current density limit of the metal segments 735 and 740 is smaller when the maximum length is larger.

Figure 8:
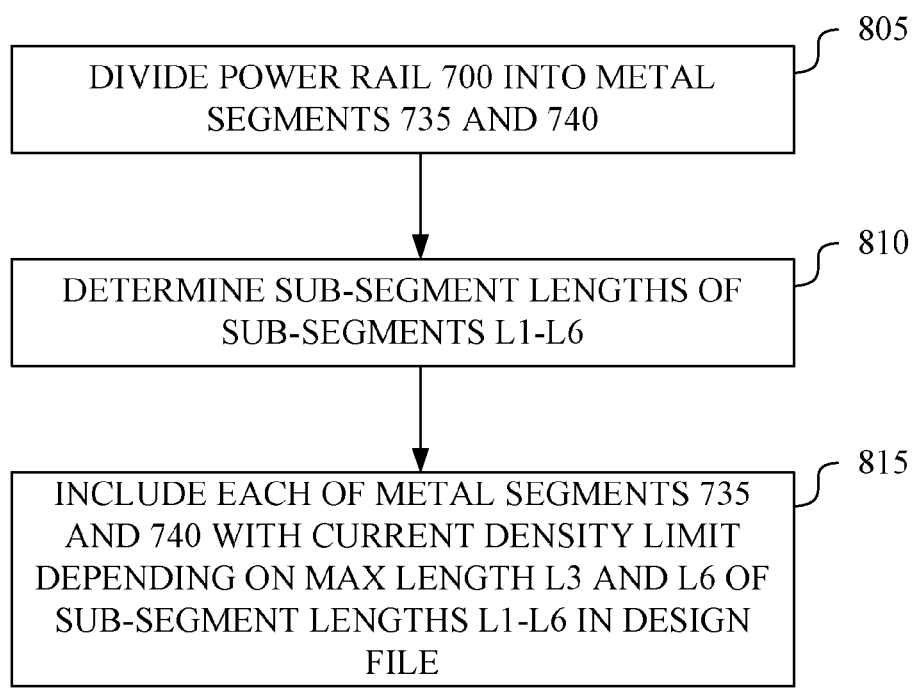
FIG. 8 is a flow chart of a method illustrating the process of forming the power rail, in accordance with various embodiments of the present disclosure.

FIG. 8 is a flow chart of a method 800 illustrating the process of forming the power rail 700, in accordance with various embodiments of the present disclosure.

For illustration, the formation of the power rail 700 in FIG. 7 is described by the method 800 with reference to FIG. 7A-7B.

In operation 805, the power rail 700 in the semiconductor device 100 illustrated in FIG. 1 is divided into metal segments 735 and 740.

In operation 810, the sub-segment lengths L1, L2 and L3 of the sub-segment 735 and the sub-segment lengths L4, L5 and L6 of the sub-segment 740 are determined.

In operation 815, each of the metal segments 735 and 740 is included in the at least one design file of the semiconductor device 100 with a current density limit depending on a maximum length L3 and L6 of the sub-segment lengths respectively.

Further, the semiconductor device 100 is fabricated according to the at least one design file.

Based on the operations 805-815, the formation of the metal segments 735 and 740 in the power rail 700 uses the maximum length of the sub-segments as the effective length to apply a more relax DC EM rule. The power rail 700 does not need to be formed according to the total length of the power rail 700.

Figure 9:
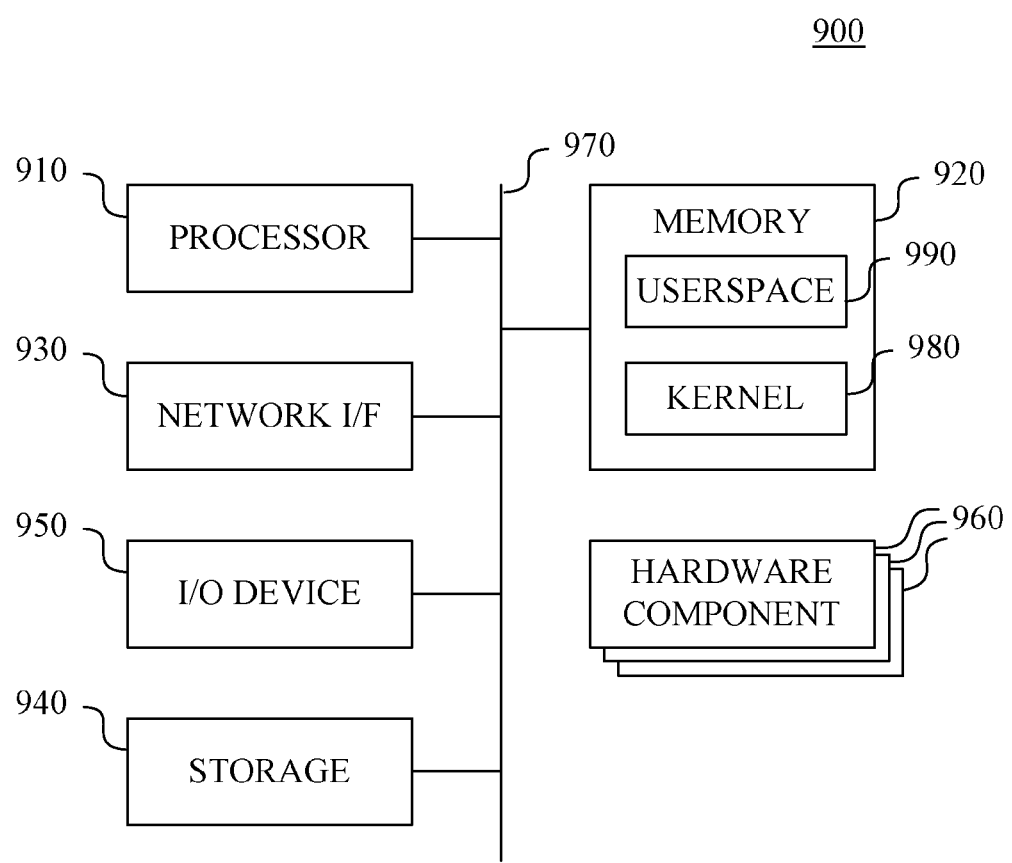
FIG. 9 is a block diagram of a computer system in accordance with various embodiments of the present disclosure.

FIG. 9 is a block diagram of a computer system 900 in accordance with some embodiments. One or more of the tools and/or systems and/or operations described with respect to FIGS. 1-8 is realized in some embodiments by one or more computer systems 900 of FIG. 9. The computer system 900 includes a processor 910, a memory 920, a network interface (I/F) 930, a storage 940, an input/output (I/O) device 950, and one or more hardware components 960 communicatively coupled via a bus 970 or other interconnection communication mechanism.

The memory 920 comprises, in some embodiments, a random access memory (RAM) and/or other dynamic storage device and/or read only memory (ROM) and/or other static storage device, coupled to the bus 970 for storing data and/or instructions to be executed by the processor 910, e.g., kernel 980, userspace 990, portions of the kernel and/or the userspace, and components thereof. The memory 920 is also used, in some embodiments, for storing temporary variables or other intermediate information during execution of instructions to be executed by the processor 910.

In some embodiments, a storage 940, such as a magnetic disk or optical disk, is coupled to the bus 970 for storing data and/or instructions, e.g., kernel 980, userspace 990, etc. The I/O device 950 includes an input device, an output device and/or a combined input/output device for enabling user interaction with the computer system 900. An input device comprises, for example, a keyboard, keypad, mouse, trackball, trackpad, and/or cursor direction keys for communicating information and commands to the processor 910. An output device comprises, for example, a display, a printer, a voice synthesizer, etc. for communicating information to a user.

In some embodiments, one or more operations and/or functionality of the tools and/or systems described with respect to FIGS. 1-8 are realized by the processor 910, which is programmed for performing such operations and/or functionality. One or more of the memory 920, the I/F 930, the storage 940, the I/O device 950, the hardware components 960, and the bus 970 is/are operable to receive instructions, data, design rules, netlists, layouts, models and/or other parameters for processing by the processor 910.

In some embodiments, one or more of the operations and/or functionality of the tools and/or systems described with respect to FIGS. 1-8 is/are implemented by specifically configured hardware (e.g., by one or more application specific integrated circuits or ASIC(s)) which is/are included) separate from or in lieu of the processor 910. Some embodiments incorporate more than one of the described operations and/or functionality in a single ASIC.

In some embodiments, the operations and/or functionality are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

In some embodiments, a method is disclosed that includes the operations outlined below. A power rail in at least one design file of a semiconductor device is divided into a plurality of metal segments, wherein each two of the neighboring metal segments are separated by a cut via that sinks electrons from both of the metal segments. Sub-segment lengths of a plurality sub-segments in each of the metal segments are determined, wherein each of the sub-segments starts from a starting via that injects electrons to the metal segments to a terminal of the metal segments. Each of the metal segments is included in the at least one design file with a current density limit depending on a maximum length of the sub-segment lengths. By using a fabrication system, the semiconductor device is fabricated according to the at least one design file.

Also disclosed is a non-transitory computer-readable medium. The non-transitory computer-readable medium contains therein instructions which, when executed by a processor of a computer system, cause the processor to execute a method that includes the operations outlined below. A power rail in at least one design file of a semiconductor device is divided into a plurality of metal segments, wherein each two of the neighboring metal segments are separated by a cut via that sinks electrons from both of the metal segments. Sub-segment lengths of a plurality sub-segments in each of the metal segments are determined, wherein each of the sub-segments starts from a starting via that injects electrons to the metal segments to a terminal of the metal segments. Each of the metal segments is included in the at least one design file with a current density limit depending on a maximum length of the sub-segment lengths. By using a fabrication system, the semiconductor device is fabricated according to the at least one design file.

Also disclosed is a method that includes the operations outlined below. A power rail in at least one design file of a semiconductor device is divided into a plurality of metal segments, wherein each two of the neighboring metal segments are separated by a cut via that sinks electrons from both of the metal segments, and the power rail is either connected to a power supply or to a ground terminal. Sub-segment lengths of a plurality sub-segments in each of the metal segments are determined, wherein each of the sub-segments starts from a starting via that injects electrons to the metal segments to a terminal of the metal segments. Each of the metal segments is included in the at least one design file with a current density limit depending on a maximum length of the sub-segment lengths. By using a fabrication system, the semiconductor device is fabricated according to the at least one design file.

In this document, the term "connected" may be termed as "electrically connected", and the term "coupled" may be termed as "electrically coupled". "Connected" and "coupled" may also be used to indicate that two or more elements cooperate or interact with each other.

The number and configuration of metal layers and the power rails in this document are for illustrative purposes. Various numbers and configurations of the metal layers and power rails are within the contemplated scope of the present disclosure.

The number of the electromigration critical length is for illustrative purposes. Various other numbers are within the contemplated scope of the present disclosure.

The above illustrations include exemplary operations, but the operations are not necessarily performed in the order shown. Operations may be added, replaced, changed order, and/or eliminated as appropriate, in accordance with the spirit and scope of various embodiments of the present disclosure.

As is understood by one of ordinary skill in the art, the foregoing embodiments of the present disclosure are illustrative of the present disclosure rather than limiting of the present disclosure. It is intended to cover various modifications and similar arrangements included within the spirit and scope of the appended claims, the scope of which should be accorded with the broadest interpretation so as to encompass all such modifications and similar structures.

What is claimed is:

1. A method comprising:
    dividing a power rail in at least one design file of a semiconductor device into a plurality of metal segments, wherein each two of the neighboring metal segments are separated by a cut via that sinks electrons from the neighboring metal segments;
    determining sub-segment lengths of a plurality sub-segments in each of the metal segments, wherein each of the sub-segments starts from a starting via that injects electrons to the metal segments to a terminal of the metal segments;
    including each of the metal segments in the at least one design file with a current density limit depending on a maximum length of the sub-segment lengths; and
    fabricating, by using a fabrication system, the semiconductor device according to the at least one design file.

2. The method of claim 1, wherein the current density limit is smaller when the maximum length is larger.

3. The method of claim 1, further comprising a step of:
    electrically coupling the power rail to a power supply or a ground terminal.

4. The method of claim 1, wherein the starting via is configured to inject the electrons to the power rail without sinking electrons.

5. The method of claim 1, wherein the current density limit of the metal segments is smaller when the maximum length is larger.

6. The method of claim 1, wherein the maximum length of the sub-segments is a longest possible distance of the migration of a plurality of metal atoms in the metal segments.

7. The method of claim 1, wherein the metal segments are included in the at least one design file by using the maximum length as an effective length.

8. The method of claim 1, wherein the power rail provides power to integrated circuit components of a device portion in the semiconductor device.

9. The method of claim 8, further comprising including a plurality of signal lines that transmit data signals or clock signals between the integrated circuit components of the device portion in the at least one design file.

10. A non-transitory computer-readable medium containing therein instructions which, when executed by a processor of a computer system, cause the processor to execute a method comprising:
    dividing a power rail in at least one design file of a semiconductor device into a plurality of metal segments, wherein each two of the neighboring metal segments are separated by a cut via that sinks electrons from the neighboring metal segments;
    determining sub-segment lengths of a plurality sub-segments in each of the metal segments, wherein each of the sub-segments starts from a starting via that injects electrons to the metal segments to a terminal of the metal segments; and
    including each of the metal segments in the at least one design file with a current density limit depending on a maximum length of the sub-segment lengths; and
    fabricating, by using a fabrication system, the semiconductor device according to the at least one design file.

11. The non-transitory computer-readable medium of claim 10, wherein the current density limit is smaller when the maximum length is larger.

12. The non-transitory computer-readable medium of claim 10, wherein the method further comprises a step of:
    electrically coupling the power rail to a power supply or a ground terminal.

13. The non-transitory computer-readable medium of claim 10, wherein the starting via is configured to inject the electrons to the power rail without sinking electrons.

14. The non-transitory computer-readable medium of claim 10, wherein the current density limit of the metal segments is smaller when the maximum length is larger.

15. The non-transitory computer-readable medium of claim 10, wherein the maximum length of the sub-segments is a longest possible distance of the migration of a plurality of metal atoms in the metal segments.

16. The non-transitory computer-readable medium of claim 10, wherein the metal segments are included in the at least one design file by using the maximum length as an effective length.

17. The non-transitory computer-readable medium of claim 10, wherein the power rail provides power to integrated circuit components of a device portion in the semiconductor device.

18. The non-transitory computer-readable medium of claim 17, wherein the method further comprises including a plurality of signal lines that transmit data signals or clock signals between the integrated circuit components of the device portion in the at least one design file.

19. The non-transitory computer-readable medium of claim 10, wherein the power rail is either coupled to a power supply or to a ground terminal.

20. A method comprising:
dividing a power rail in at least one design file of a semiconductor device into a plurality of metal segments, wherein each two of the neighboring metal segments are separated by a cut via that sinks electrons from the neighboring metal segments, and the power rail is either coupled to a power supply or to a ground terminal;
determining sub-segment lengths of a plurality sub-segments in each of the metal segments, wherein each of the sub-segments starts from a starting via that injects electrons to the metal segments to a terminal of the metal segments;
including each of the metal segments in the at least one design file with a current density limit depending on a maximum length of the sub-segment lengths; and
fabricating, by using a fabrication system, the semiconductor device according to the at least one design file.

* * * * *